Sept. 6, 1949.　　　　L. Q. PRESBY　　　　2,481,342
STRIP CUTTING MACHINE
Filed Aug. 22, 1945　　　　　　　　7 Sheets-Sheet 1

Inventor
Leroy Q. Presby
by Emery Booth Townsend Miller & Widger
Attys

Sept. 6, 1949.　　　　　L. Q. PRESBY　　　　　2,481,342
STRIP CUTTING MACHINE
Filed Aug. 22, 1945　　　　　　　　　　　　　　7 Sheets-Sheet 2
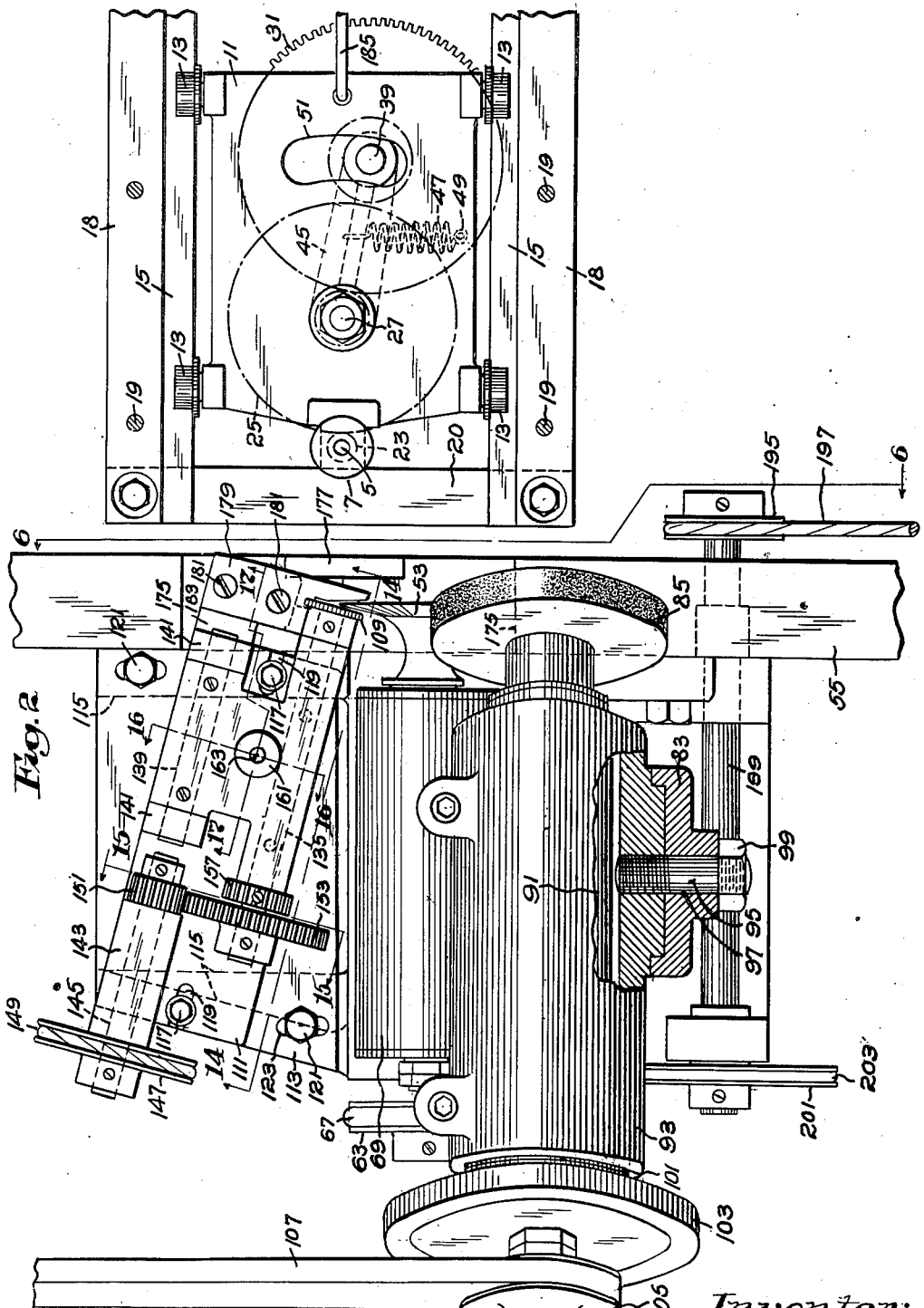
Inventor:
Leroy Q. Presby

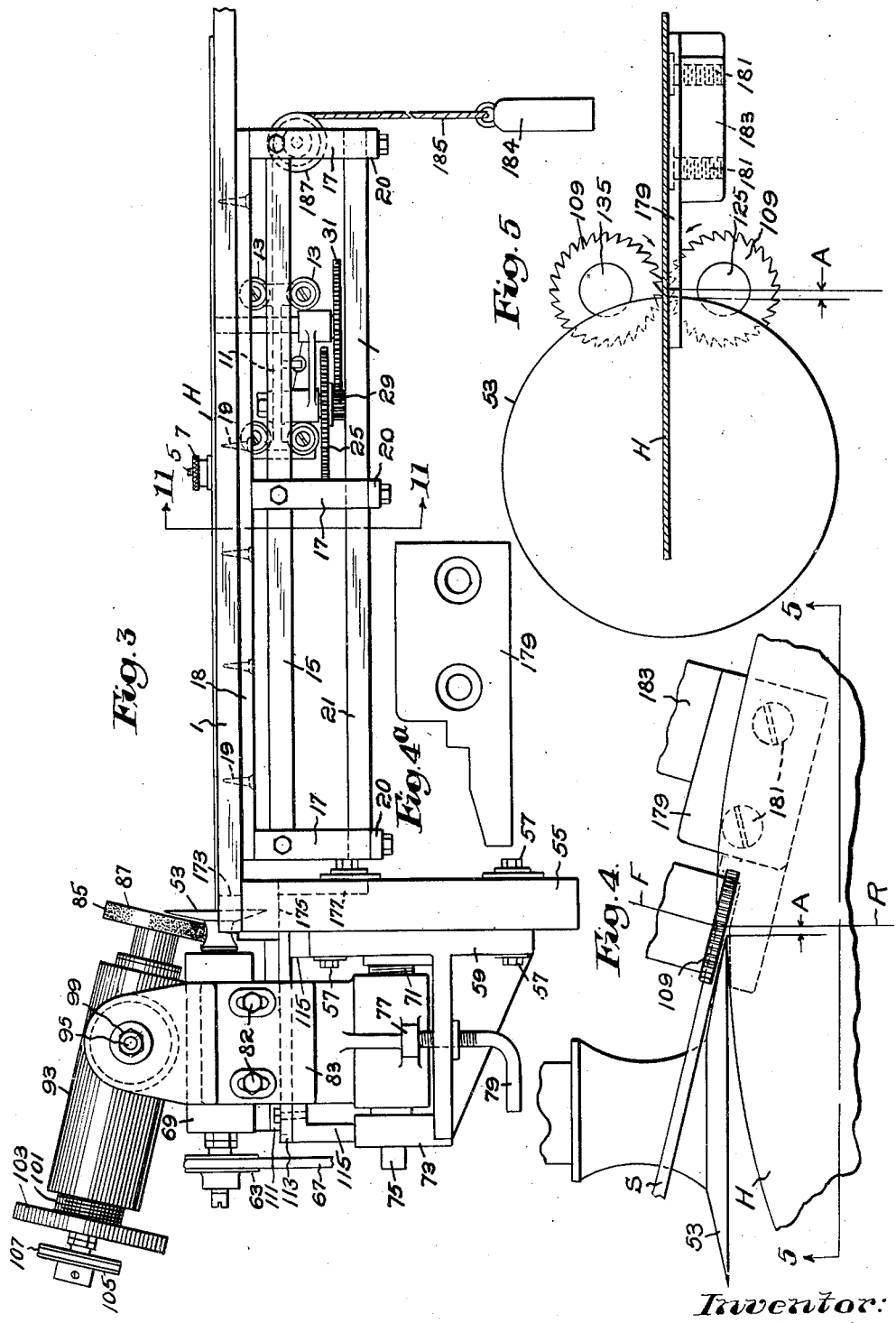

Sept. 6, 1949.    L. Q. PRESBY    2,481,342
STRIP CUTTING MACHINE
Filed Aug. 22, 1945    7 Sheets-Sheet 5
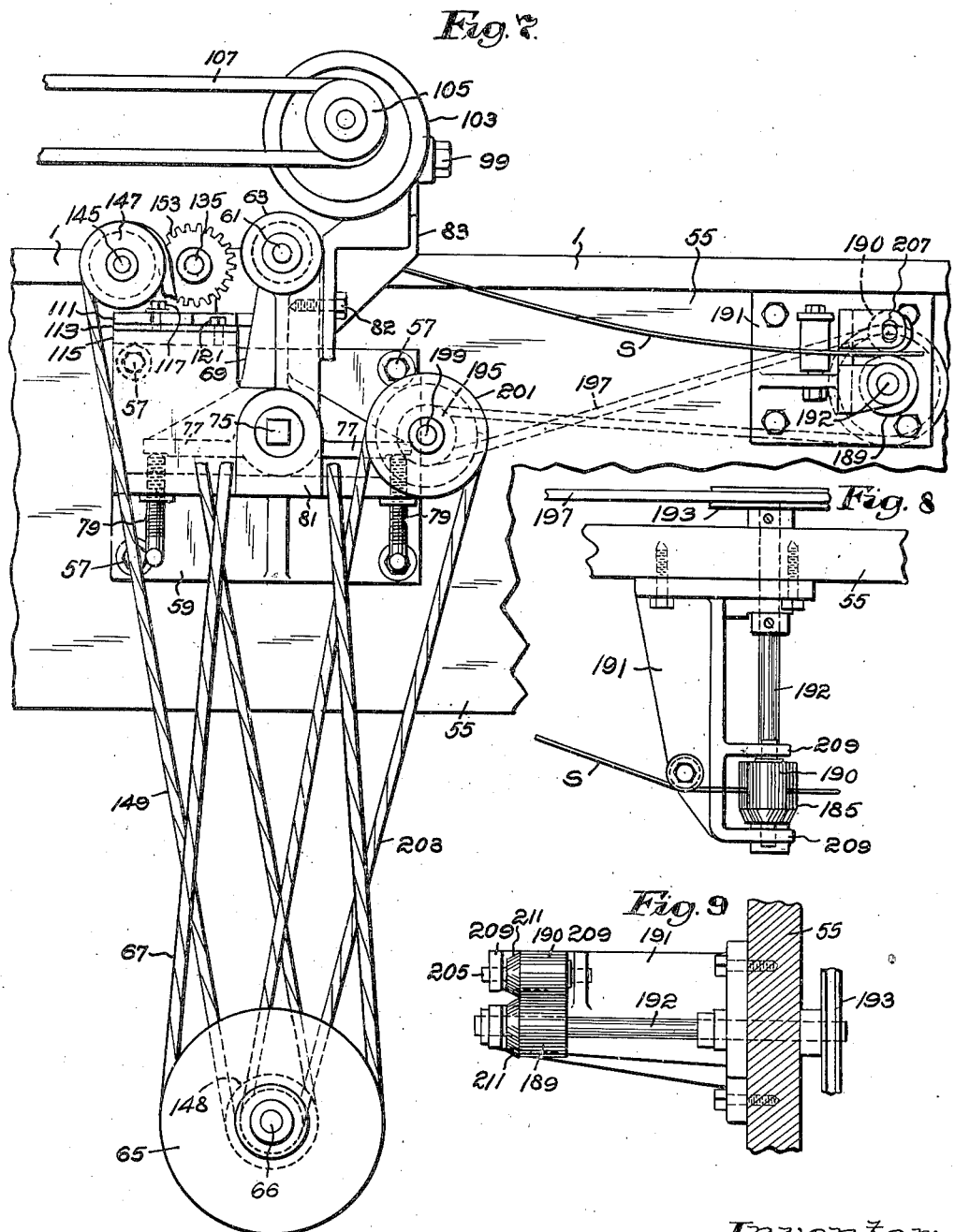
Inventor:
Leroy Q. Presby,
by Emery, Booth, Townsend, Miller & Weidner
Attys Sept. 6, 1949.                L. Q. PRESBY                2,481,342
                           STRIP CUTTING MACHINE
Filed Aug. 22, 1945                                   7 Sheets-Sheet 6

Inventor:
Leroy Q. Presby.
by Emery Booth Townsend Miller & Weidner
Attys

Sept. 6, 1949. L. Q. PRESBY 2,481,342
STRIP CUTTING MACHINE
Filed Aug. 22, 1945 7 Sheets-Sheet 7
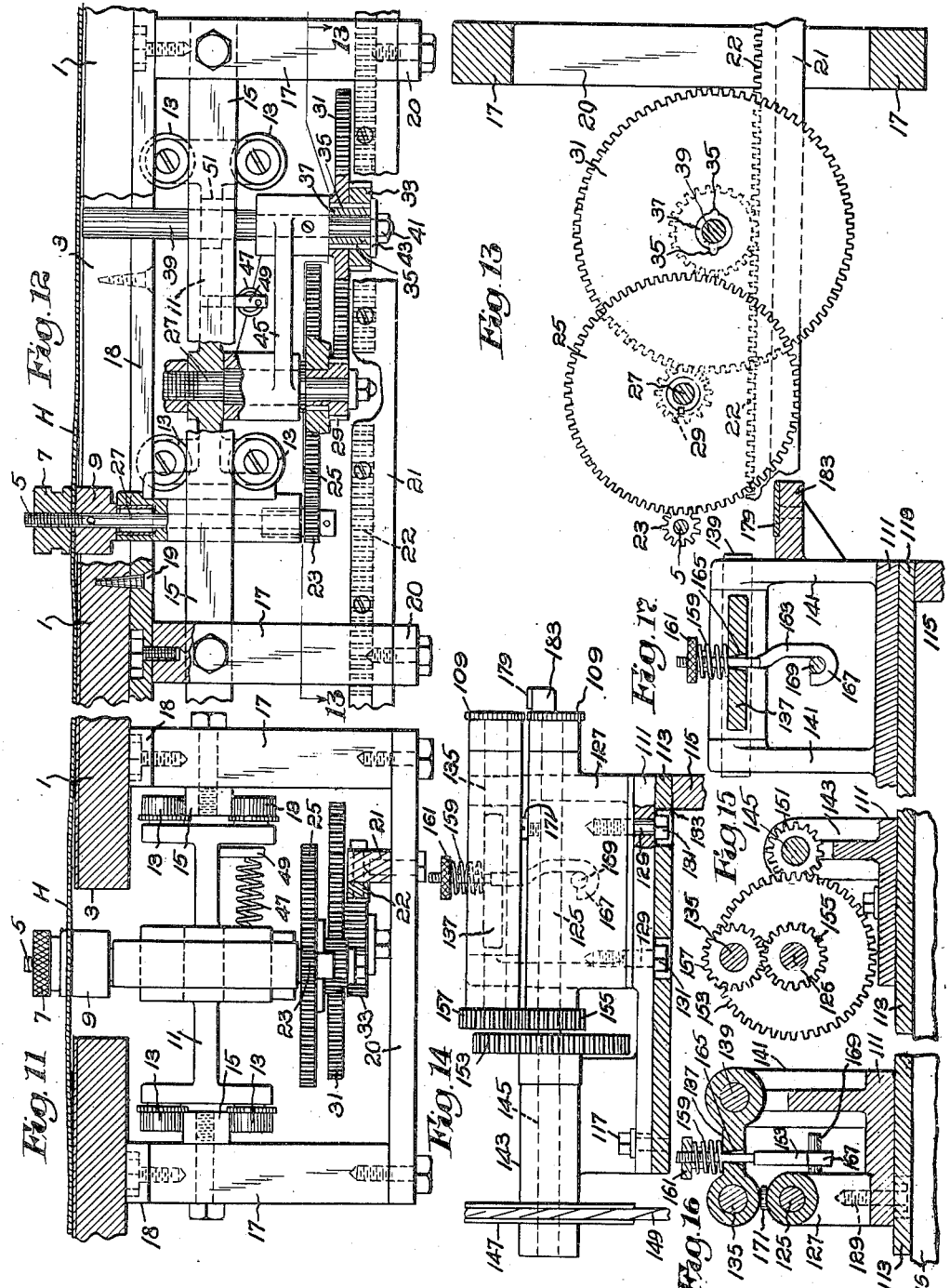
Inventor:
Leroy Q. Presby Patented Sept. 6, 1949

2,481,342

UNITED STATES PATENT OFFICE 2,481,342

STRIP CUTTING MACHINE

Leroy Q. Presby, Melrose, Mass., assignor to American Stay Company, East Boston, Mass., a corporation of Massachusetts Application August 22, 1945, Serial No. 612,092

12 Claims. (Cl. 164—37)

My invention relates to machines for cutting strips spirally from circular sheets of flexible material such as tanned goat or calf skin.

The present invention constitutes an improvement on the machine according to Frank W. Merrick United States Patent 874,102, issued December 17, 1907. In this prior machine the portion of the circular sheet adjacent its periphery is engaged between a pair of opposite feed rolls which are slotted circumferentially for receiving the cutting end of a stationary knife. The feed rolls and the knife are arranged at a slight angle to that radius of the sheet which intersects the point where they act upon it, which is stated by the patent to be for the purpose of subjecting the sheet at that point to radial tension. This prior machine has the defect of cutting the strip along a wavy irregular line which is so pronounced that satisfactory results cannot be obtained with it for cutting strips under about 3/8 inch in width. Furthermore this defect becomes so pronounced as the diameter of the sheet is decreased that for all practical purposes the machine becomes inoperative when the sheet is reduced to about 12 inches in diameter, thus resulting in great accumulation of scrap of little economic value.

Applicant has found that if the feed rolls are arranged to operate upon the sheet at a point slightly in advance of the knife, particularly if the knife is a rotary knife, and the feed rolls operate only on the portion of the sheet which is to be severed therefrom to form the strip, the above defects of the prior machine will be avoided. With applicant's arrangement of parts extremely narrow strips, say strips of width in the order of 1/16 inch, with exactly parallel edges may be cut from the sheet even when the latter is reduced to about 2 inches in diameter.

In employing the prior machine in the operation of making leather lacing, such as is disclosed by Frank W. Merrick United States Patent 1,734,738, issued November 5, 1929, it is necessary to cut strips about 1/2 inch wide from a circular sheet cut from the hide, which strips because of their width are necessarily relatively short. It is then necessary to skive the ends of the strips and cement the strips together end to end to form long lengths of strip, after which the edges of these long lengths must be trimmed to render said edges parallel, and then necessary to split the long lengths longitudinally into strips about 1/16 inch wide. With the present machine, however, the circular leather sheet can be directly cut into strips about 1/16 inch wide, which strips, because of their narrowness and the fact that with the present machine the sheet may be cut until it is about 2 inches in diameter, are several hundred yards long each sufficient to fill a spool of the lacing, it being understood in these connections that the maximum diameter of the circular sheet that can be cut from the ordinary hide of goat or calf suitable for forming lacing is about 30 inches.

It is not wholly understood why the prior machine has the defects above mentioned, or why the present machine avoids them. It, however, will be noted that in the prior machine the feed rolls act on portions of the sheet at both sides of the knife and at the point where the knife cuts. Apparently, in the prior machine the portions of the feed rolls at the side of the knife facing the center post on which the sheet is mounted act to crowd the sheet against that side of the knife and thus fail to draw taut the portion of the sheet between the knife and the center post. Further, in the prior machine, because the knife and feed rolls act on the sheet at points on the same radial line of the sheet, the feed rolls apparently cannot hold the sheet under radial tension while it is being cut, which defect apparently still would exist did the feed rolls act only on the portion of the sheet cut therefrom by the knife. Whatever the reason for the defects of the prior machine may be they are nevertheless avoided in the present machine in which the feed rolls act on the sheet in advance of the knife and only on the portion of the sheet which is cut therefrom to form the strip.

In the drawings:

Fig. 2 is a plan, on an enlarged scale, of a fragment of the machine according to Fig. 1, with the table top omitted and parts in a different operative position;

Fig. 3 is a side elevation of the machine according to Fig. 1, with parts omitted;

Fig. 4 is a plan of a fragment of the machine according to Fig. 1, on an enlarged scale, with parts omitted, showing a detail;

Fig. 4a shows a detail;

Fig. 5 is a section on the line 5—5 of Fig. 4;

Fig. 7 is an elevation, on an enlarged scale, of the machine according to Fig. 1 as viewed from the left, with parts broken away;

Fig. 8 is a plan, on an enlarged scale, of the parts shown at the right hand side of Fig. 7, with parts omitted;

Fig. 9 is an elevation of the parts shown by Fig. 8 looking from the right;

Fig. 11 is a section on the line 11—11 of Fig. 3 on an enlarged scale;

Fig. 12 is an elevation of the parts according to Fig. 11 as viewed from the right, with parts in section and parts omitted;

Fig. 13 is a section on the line 13—13 of Fig. 12; and

Figure 1:
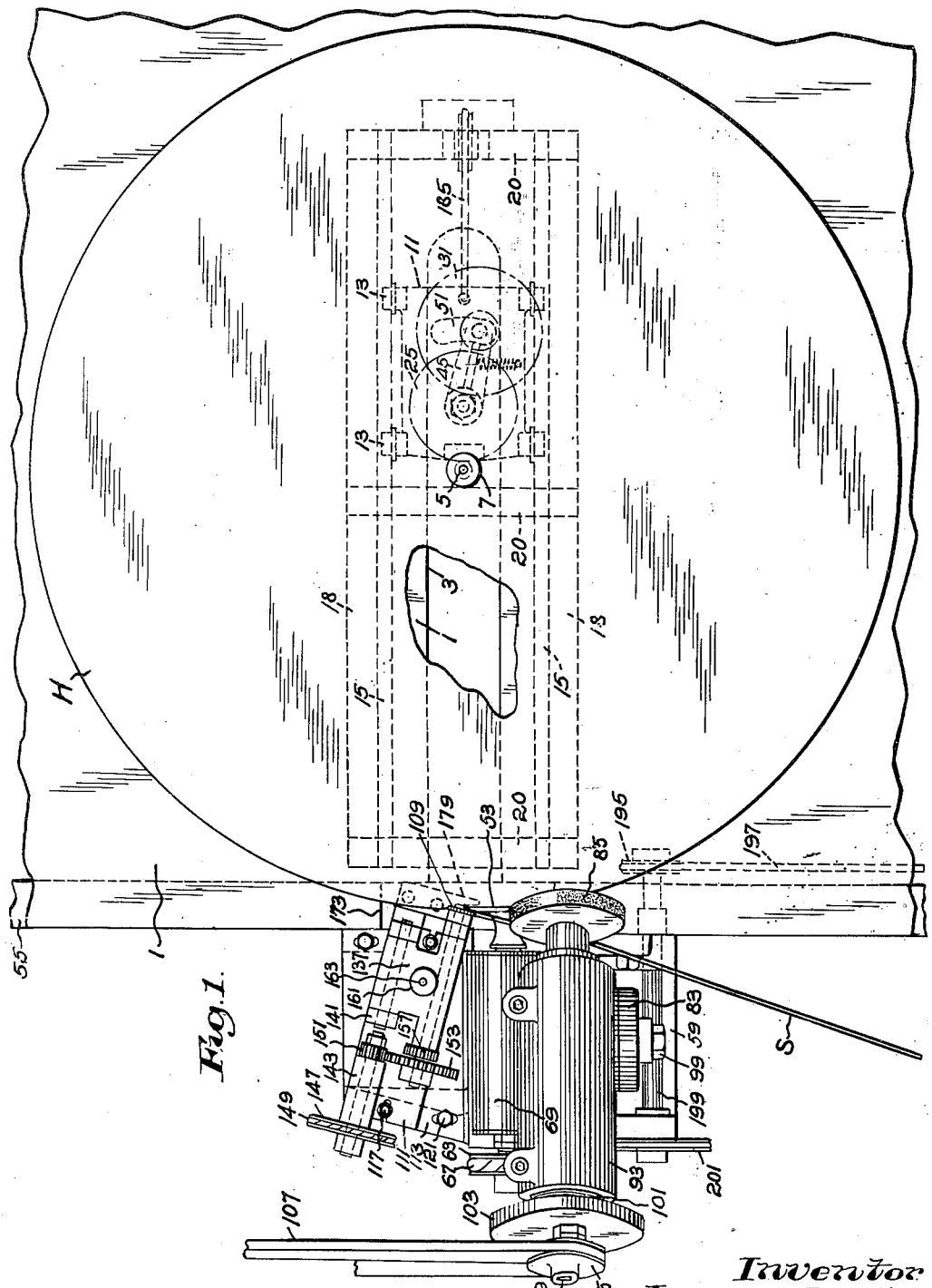
Fig. 1 is a plan of a machine according to the invention, with parts broken away, showing a circular sheet of leather being operated upon for cutting a strip therefrom.

Figs. 14, 15, 16 and 17 are, respectively, sections on the lines 14—14, 15—15, 16—16 and 17—17 of Fig. 2.

As illustrated, the machine comprises a table top 1 which supports the sheet H, the legs of the table not being shown. In this table top is formed a slot 3 (Figs. 1 and 11) through which projects a post 5 adapted to extend through a perforation at the center of the circular sheet H to be operated upon. The upper portion of the post is screw-threaded for removably receiving a finger nut 7 for clamping the sheet against a collar 9 fixedly carried by the post. By this construction when the sheet is rotated it will cause the post to rotate.

The rotary post 5 is shown as carried by a carriage 11 (Figs. 1, 2, 3, 11 and 12), which latter is provided with wheels 13 engaging the upper and lower sides of spaced tracks 15 so that the post 5 may be moved lengthwise of the slot 3. As shown, the tracks 15 are supported beneath the table top by posts 17 formed as part of a frame 18 secured to the under side of said top by the screws 19.

As illustrated, the frame 18 comprises crossbars 20 secured to the posts 17, which cross-bars support an elongated bar 21 carrying a rack 22, the latter extending beneath the table top parallel to the slot 3. As shown, the post 5 at its lower end has fixed thereto a pinion 23, which pinion meshes with a gear 25 rotatably mounted on a spindle 27 fixed to and projecting downwardly from the carriage. Fixed to the gear 25 so as to rotate therewith on the spindle is a pinion 29 which meshes with a gear 31. Rotatable with the gear 31 is a pinion 33 meshing with the rack. By this means, when the post 5 is rotated by the sheet H, the rack pinion 33 will be rotated at a reduced speed for advancing the carriage for moving the post 5 along the slot so as to feed the sheet H radially toward the knife. As shown, the rack pinion 33 is splined at 35 to a bushing 37 rotatably mounted on the lower end portion of a spindle 39, the pinion being detachably held on the bushing by a removable nut 41, screw-threaded on the end of the spindle, and a washer 43 against which the nut bears. By this arrangement different pitch diameter rack pinions 33 may be substituted for effecting different rates of feed of the carriage for determining different desired widths of the strip to be cut from the sheet.

As shown, the spindle 39 for the rack pinion 33 is fixedly carried by an arm 45 swingingly mounted on the spindle 27. Normally the rack pinion is held in engagement with the rack by the coiled tension spring 47, which latter is secured at one end to a pin 49 extending from the carriage, and, at its other end, to the arm 45. The spindle 39 extends upwardly through a slot 51 (Fig. 2) in the carriage, and terminates within the slot 3, thus enabling the operator, by manual swinging movement of the spindle, to disengage the rack pinion from the rack so that the carriage, when desired, may be moved manually along the tracks 15.

Figure 6:
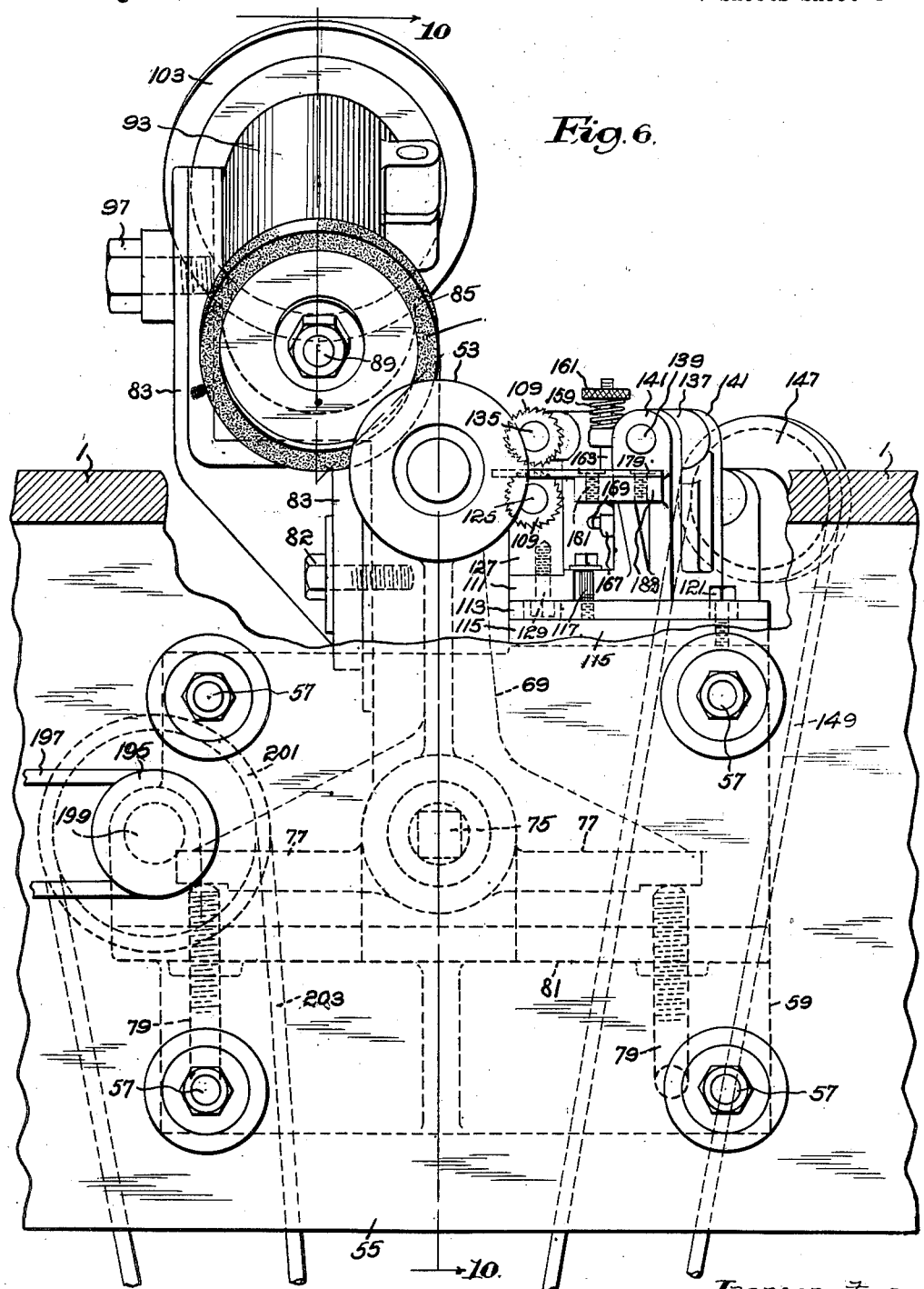
Fig. 6 is a section on the line 6—6 of Fig. 2, with parts broken away.
Figure 10:
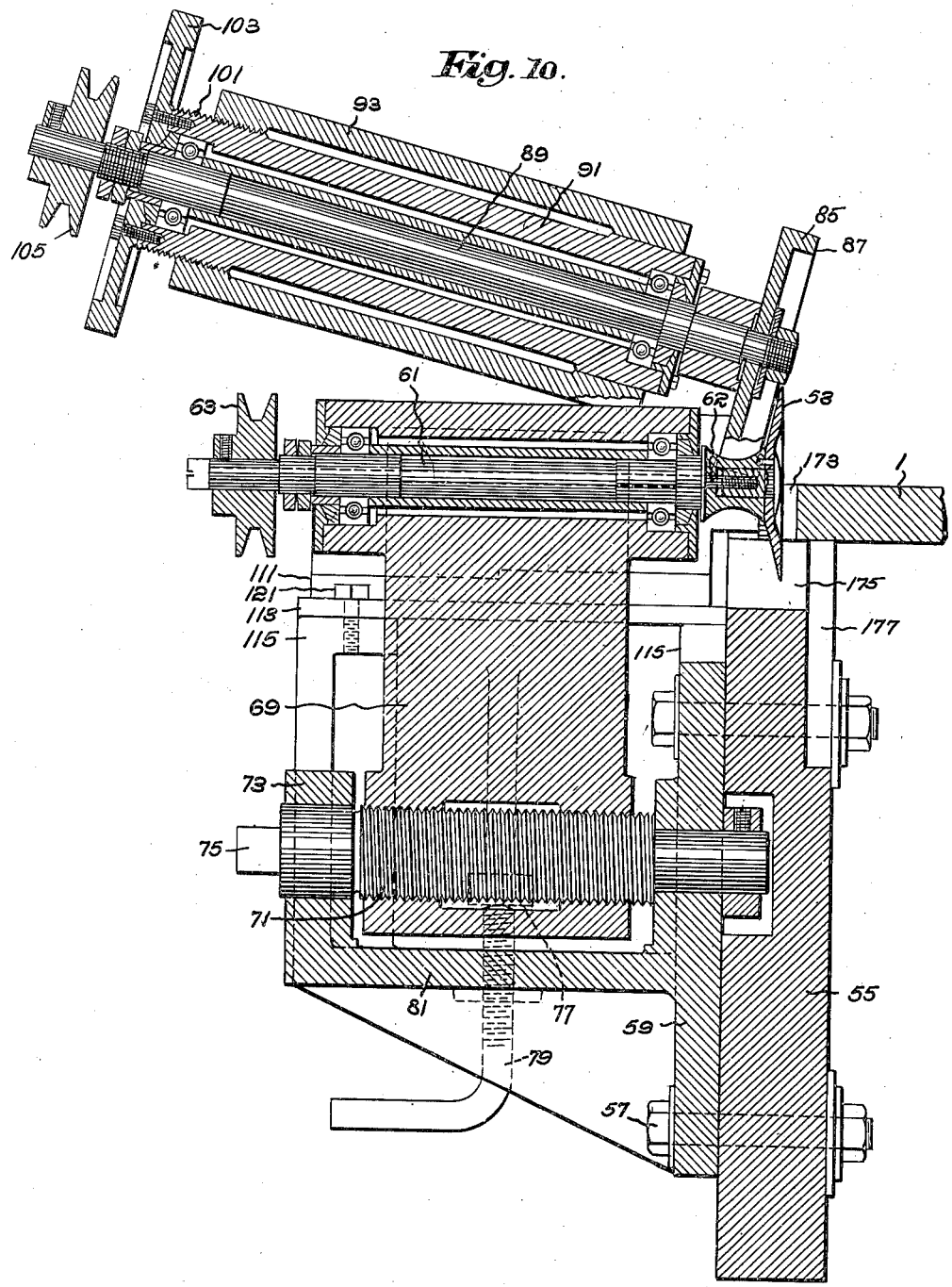
Fig. 10 is a section on the line 10—10 of Fig. 6.

The rotary knife 53, which cuts the strip S from the circular sheet H is supported by a bracket 59 secured to the vertical end member 55 of the table by bolts 57. The knife is detachably secured to one end of a spindle 61 (Fig. 10), the opposite end of the spindle carrying a pulley 63 about which and a driving pulley 65 on the drive shaft 66 of the machine (Fig. 7) passes a belt 67. The knife spindle 61 is rotatably mounted in the upper portion of a member 69, the mounting being such as to restrain the spindle against axial movement. The member 69, as best shown in Figs. 6, 7 and 10, at its lower end is mounted for swinging on a screw-threaded arbor 71. As shown, the arbor is rotatably mounted at one end in the base portion of the bracket 59 and at its opposite end in the upstanding lug 73 formed integrally with said bracket in spaced relation to said base portion. At its end adjacent the lug 73 the arbor is formed with a squared projection 75 for engagement by a wrench for turning the arbor, by which means the knife may be axially adjusted relative to the table top. For adjusting the knife transversely of its axis the member 69 is provided with oppositely projecting portions 77 (Figs. 6 and 7) the under sides of which are engaged by adjusting screws 79 screw-threadedly extending through the portion 81 of the bracket which carries the lug 73. As will be obvious, by backing off one screw 79 and screwing up the other the member 69 may be adjustably tilted in either of opposite directions.

Secured by bolts 82 to one side of the tiltable member 69 which carries the knife spindle is a bracket 83 (Figs. 3, 6 and 7) which carries a grinding wheel 85 the annular flat surface 87 of which is adapted to operate upon the cutting edge of the knife when desired. This grinding wheel, as shown in Fig. 10, is carried by a spindle 89 rotatably mounted in a sleeve 91. The sleeve 91 extends through an outer sleeve 93, which latter is fixedly provided with a stud 95 (Fig. 2), this stud rotatably extending through an opening 97 in the bracket 83. A clamping nut 99 on the outer end of the stud and bearing against the bracket 83 serves to clamp the sleeve 93 on the bracket in adjusted positions determined by tilting the sleeve 93 about the axis of said stud. The sleeve 91, as shown in Fig. 10, has a screw-threaded portion 101 screw-threadedly received in an end of the sleeve 93. By means of a hand-wheel 103 carried by the sleeve 91, the grinding wheel may be adjusted into and out of contact with the knife 53. For driving the spindle 89 which carries the grinding wheel, the spindle at its end opposite said wheel is provided with a pulley 105 about which passes a belt 107 (Fig. 7) leading to a driving motor (not shown).

Opposite sides of the sheet H at its peripheral portion are engaged by a pair of opposite toothed feed rolls 109. These feed rolls are carried by a plate 111 (Figs. 2, 7, 10, 14 and 16) which rests upon a plate 113, the latter at opposite ends resting upon shelves 115 integrally formed as side extensions of the bracket 59. The plate 111 is secured to the plate 113 by stud bolts 117 tapped into the plate 113, these stud bolts extending through slots 119 in the plate 111 so that the latter may be adjusted relative to the plate 113 axially of the feed rolls for moving the latter toward or away from the knife, as viewed in Fig. 2. The plate 113 is secured to the shelves 115 by stud bolts 121 which extend through slots 123 in said plate, which permits the feed rolls to be adjusted normally to the axis of the knife 53.

As illustrated, the lower feed roll 109 is carried by a spindle 125 (Figs. 6, 14, 15 and 16) journaled in a bearing block 127. The bearing block is rigidly secured to the plate 111 by bolts 129 tapped into the bearing block and extending through openings in the plate. The heads 131 of these bolts are received in openings 133 in the plate 113, which openings are of sufficient size to permit axial adjustment of the feed rolls in the way above described. The upper feed roll 109 is carried at the end of a spindle 135 journaled in a bearing block 137, which latter is carried by an arbor 139 the opposite ends of which are rotatably received in the spaced upstanding lugs 141 formed integrally with the plate 111.

For driving the feed rolls 109, the plate 111 is integrally formed with an upstanding bearing block 143 in which is journaled the lay shaft 145, the latter at one end carrying a pulley 147 around which and a driving pulley 148 on the shaft 66 passes a belt 149 (Fig. 7). The lay shaft 145 at its end opposite the pulley 147 fixedly carries a gear 151, which latter meshes with a gear 153 fixedly carried at the adjacent end of the spindle 125 for the lower feed roll. This spindle 125 also fixedly carries a gear 155 which meshes with a gear 157 (Figs. 14 and 15) fixedly carried by the spindle 135 for the upper feed roll. The gears 155 and 157 are of the same pitch diameter, and consequently the spindles 125 and 135 carrying the two feed rolls are rotated at the same speed in opposite directions. For holding the gears 155 and 157 in mesh, a compression spring 159 is provided. This spring, as shown in Fig. 16, at its lower end abuts against the upper surface of the bearing block 137, and at its upper end against a nut 161 carried by the upper screw-threaded portion of a rod 163. The rod extends loosely through an opening 165 in the bearing block to the under side of the latter, and at its lower end is bent to form a hook 167 which engages a pin 169 fixedly carried by the bearing block 127. This spring, the tension of which can be adjusted by the nut 161, serves to hold the toothed peripheries of the feed rolls in engagement with the opposite sides of the sheet H being operated upon. A stop 171 carried by the bearing block 127 acts to insure that the toothed peripheries of the two rotating feed rolls will not come into contact before the sheet is entered between them.

As shown in Figs. 1, 2 and 3, the table top and end member 55 of the table are cut away at 173 and 175 to clear the knife and lower feed roll 109, the end member 55 being also cut away at 177 to permit the post or center 5 to be moved the maximum distance possible toward the knife. For supporting the sheet at this cutaway portion of the table top is provided a thin metal plate 179 (Figs. 1, 2, 4, 4a, 5 and 6) fixedly secured by screws 181 to a lug 183 integrally formed with and laterally projecting from one of the upstanding lugs 141 carried by the plate 111. As best shown in Figs. 4 and 4a, the edges of this plate are cut away closely to conform to the adjacent edges of the knife and feed rolls.

As best shown in Fig. 4, the axis F of rotation of each feed roll 109 is arranged at a slight angle to that radius R of the sheet H which intersects the point of contact of the feed rolls with the sheet. This serves to cause the sheet to be drawn between the two feed rolls when its circular edge is presented thereto upon the circular sheet being mounted on the center 5 and said center moved manually by the operator to present said edge to said rolls. The feed rolls also serve to rotate the sheet and the center 5 to which the sheet is attached, rotation of the center in the way hereinbefore explained acting to feed the sheet radially toward the knife so that the strip S will be cut spirally from the rotating sheet. The feed rolls still further act to tension the sheet radially between the center 5 and the point of contact of said rolls with the sheet. As shown in Figs. 4 and 5, the cutting edge of the knife is slightly spaced from the radial line R a small distance represented by the dimension A on said figures. This distance is not critical so long as it suffices to insure that the tensioned portion of the sheet is presented to said cutting edge. In practice the dimension A may be about 1/16 inch. It will be observed that with this arrangement the portion of the sheet being cut is placed under tension before it reaches the cutting edge, and is under tension while it is being cut. Friction of the gearing between the center 5 and the rack 21 resists lateral movement of the center under the influence of the radial pull on the sheet by the feed rolls, which resistance is augmented by a weight 184 suspended by a cord 185 which passes over a pulley 187 on the frame 18 and is attached to the carriage 11 supporting the center, this weight also acting to take up any lost motion that may exist in the gearing.

The teeth on the feed rolls are sharp enough to insure continuous rotation of the sheet and at the same time draw it radially for rendering it taut while being cut, but without cutting the sheet. No slippage occurs between the feed rolls circumferentially of the sheet, but said rolls slip radially of the sheet and thus in effect frictionally engage it in respect to drawing it radially.

Conveniently, the strip S after being cut is held under slight tension to insure against its tangling up with the feed rolls. For this purpose the strip after being cut passes through a pair of feed rolls 189 and 190 (Figs. 7, 8 and 9) carried by a bracket 191 fixedly secured to the outer vertical side of the table end member 55. The lower feed roll 189, as shown, is fixedly mounted on a spindle 192, this spindle at its end opposite the roll being provided with a pulley 193 about which and a pulley 195 passes a belt 197, the pulley 195 being carried on a shaft 199 provided with a pulley 201 for driving the shaft. About the pulley 201 passes a belt 203 driven by a pulley on the drive shaft 66 for the machine. The upper roll 190 is fixedly mounted on a spindle 205 loosely supported for vertical movement in slot-like bearings 207 in spaced lugs 209 formed integrally with the bracket 191. The outer ends of the two rolls 189 and 190 are tapered to form frusto-conical surfaces 211, which permits the strip to be readily entered between said rolls when presented laterally thereto by the operator by way of the space between said conical surfaces.

It will be understood that within the scope of the appended claims wide deviations may be made from the form of the invention described without departing from the spirit of the invention.

I claim:

1. A machine for substantially spirally cutting a strip from a circular sheet of flexible material having, in combination, a knife for severing the strip spirally from the sheet, means for supporting the sheet for axial rotation and advancing the rotating sheet radially toward the knife, and means for operating upon that portion only of the sheet which is to be severed therefrom, at a point close to but in advance of the knife, for placing the portion of the sheet between its axis and the point of contact of the last mentioned means therewith under radial tension, whereby the knife cuts through the portion of the sheet so tensioned.

2. A machine for substantially spirally cutting a strip from a circular sheet of flexible material having, in combination, a knife for severing the strip spirally from the sheet; means for rotatably supporting and rotating the sheet and substantially continuously advancing it radially toward the knife; said sheet rotating means operating on that portion only of the sheet to be severed therefrom, at a point close to but in advance of the knife, for placing the portion of the sheet between its axis and the point of contact of the last mentioned means therewith under radial tension, whereby the knife cuts through the portion of the sheet so tensioned.

3. A machine for substantially spirally cutting a strip from a circular sheet of flexible material having, in combination, means for supporting the sheet for axial rotation; a knife positioned to operate on the peripheral portion of the rotating sheet for severing the strip spirally therefrom; means for frictionally engaging that portion only of the sheet which is to be severed therefrom, at a point close to but in advance of the point where the knife operates on the sheet, adapted to place the portion of the sheet between its axis and the point of engagement of the last mentioned means therewith under radial tension, whereby the knife cuts through the portion of the sheet so tensioned; and means for substantially continuously advancing the rotating sheet radially toward said knife.

4. A machine for substantially spirally cutting a strip from a circular sheet of flexible material having, in combination, means for supporting the sheet for axial rotation; a rotary knife positioned to operate on the peripheral portion of the rotating sheet for severing the strip spirally therefrom; means for frictionally engaging that portion only of the sheet which is to be severed therefrom, at a point close to but in advance of the point where the knife operates on the sheet, adapted to place the portion of the sheet between its axis and the point of engagement of the last mentioned means therewith under radial tension, whereby the knife cuts through the portion of the sheet so tensioned; and means for substantially continuously advancing the rotating sheet radially toward said knife.

5. A machine for substantially spirally cutting a strip from a circular sheet of flexible material having, in combination, means for supporting the sheet for axial rotation; a rotary knife positioned to operate on the peripheral portion of the rotating sheet for severing the strip spirally therefrom; rotary means for frictionally engaging the portion of the sheet which is to be severed therefrom, at a point close to but in advance of the point where the knife operates on the sheet, adapted to place the portion of the sheet between its axis and the point of engagement of the last mentioned means therewith under radial tension; and means for substantially continuously advancing the rotating sheet radially toward said knife.

6. A machine for substantially spirally cutting a strip from a circular sheet of flexible material having, in combination, means for supporting the sheet for axial rotation, which means comprises a center on which the sheet is adapted to be axially mounted; a rotary knife adapted to operate on the rotating sheet for severing the strip spirally therefrom; means comprising a rotary feed roll for peripherally engaging that portion only of the sheet which is to be severed therefrom, at a point close to but in advance of the knife, for rotating the sheet, the axis of which feed roll is inclined to the radial plane of the sheet intersecting the point of contact of said roll with the sheet at such angle as to place the portion of the sheet between said center and such point of contact under radial tension; and means for advancing said center substantially continuously laterally toward the knife.

7. A machine for substantially spirally cutting a strip from a circular sheet of flexible material having, in combination, a support for the sheet; an axially rotatable center on which the sheet is adapted to be relatively non-rotatably mounted for axial rotation; a rotary knife positioned to operate substantially tangentially on the peripheral portion of the rotating sheet from one side thereof for spirally severing the strip therefrom; a pair of oppositely positioned, rotary, driven feed rolls for peripherally engaging opposite sides of that portion only of the sheet which is to be severed therefrom, at points close to but in advance of the point where the knife operates on the sheet, which feed rolls have their axes so positioned as to lie at an angle to the radial plane of the sheet intersecting the points of contact of said rolls with the sheet for placing the portion of the sheet between said center and such points of contact under radial tension while rotating the sheet and said center; and means operated by rotation of said center for substantially continuously advancing the latter laterally toward the knife.

8. A machine for substantially spirally cutting a strip from a circular sheet having, in combination, means for supporting and rotating the sheet comprising a rotary presser roll; a rotary knife for operating on the sheet at a point close to the point where said presser roll contacts the sheet; and a mounting for said knife having provision for adjusting the latter axially and laterally relative to said presser roll.

9. A machine for substantially spirally cutting a strip from a circular sheet having, in combination, means for supporting and rotating the sheet comprising a rotary presser roll; a rotary knife for operating on the sheet at a point close to the point where said presser roll contacts the sheet; a mounting for said knife; and means supporting said mounting for swinging about an axis parallel to the axis of rotation of said knife in directions substantially normal to the radius of the sheet intersecting the point at which the knife operates on the sheet.

10. A machine for substantially spirally cutting a strip from a circular sheet having, in combination, means for supporting and rotating the sheet comprising a rotary presser roll; a rotary knife for operating on the sheet at a point close to the point where said presser roll contacts the sheet; a mounting for said knife; means supporting said mounting for swinging about an axis parallel to the axis of rotation of said knife in directions substantially normal to the radius of the sheet intersecting the point at which the knife operates on the sheet; and means for adjusting said mounting lengthwise of its axis of swinging.

11. A machine for substantially spirally cutting a strip from a circular sheet having, in combination, means for supporting and rotating the sheet comprising a rotary presser roll; a rotary knife for operating on the sheet at a point close to the point where said presser roll contacts the sheet; and means mounting said presser roll for axial adjustment, and for lateral adjustment toward and away from the axis of said knife.

12. A machine for substantially spirally cutting a strip from a circular sheet having, in combination, means for supporting and rotating the sheet comprising a rotary presser roll; a rotary knife for operating on the sheet at a point close to the point where said presser roll contacts the sheet; means mounting said presser roll for axial adjustment, and for lateral adjustment toward and away from the axis of said knife; and means mounting said knife for axial adjustment, and for adjustment transverse to its axis.

LEROY Q. PRESBY.

REFERENCES CITED

The following references are of record in the file of this patent:

UNITED STATES PATENTS

| Number | Name | Date |
| --- | --- | --- |
| 874,102 | Merrick | Dec. 17, 1907 |